United States Patent
Brisbane et al.

(10) Patent No.: US 12,381,266 B2
(45) Date of Patent: Aug. 5, 2025

(54) BATTERY CELL GROUP TEMPERATURE MEASUREMENT SYSTEM

(71) Applicant: GM GLOBAL TECHNOLOGY OPERATIONS LLC, Detroit, MI (US)

(72) Inventors: Roger M. Brisbane, Honeoye Falls, NY (US); Paul R. Campbell, Rochester, MI (US); Seth P. Mansfield, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 617 days.

(21) Appl. No.: 17/870,118

(22) Filed: Jul. 21, 2022

(65) Prior Publication Data
US 2024/0030507 A1   Jan. 25, 2024

(51) Int. Cl.
*H01M 10/48* (2006.01)
*G01J 5/04* (2006.01)
*H01M 50/249* (2021.01)
*H01M 50/287* (2021.01)

(52) U.S. Cl.
CPC ........... *H01M 10/486* (2013.01); *G01J 5/045* (2013.01); *H01M 10/482* (2013.01); *H01M 50/249* (2021.01); *H01M 50/287* (2021.01); *H01M 2220/20* (2013.01)

(58) Field of Classification Search
CPC ............. H01M 10/486; H01M 10/482; H01M 50/249; H01M 50/287; G01J 5/045
USPC .......................................................... 429/90
See application file for complete search history.

(56) References Cited

U.S. PATENT DOCUMENTS

| | | |
|---|---|---|
| 9,648,538 B2 | 5/2017 | Ganesan |
| 9,992,735 B1 | 6/2018 | Crosbie et al. |
| 10,887,808 B1 | 1/2021 | McPhee et al. |
| 11,089,529 B1 | 8/2021 | Lekutai |
| 2010/0164790 A1 | 7/2010 | Wisnewski et al. |
| 2014/0140369 A1 | 5/2014 | Erhart |
| 2017/0328783 A1 | 11/2017 | Okamoto et al. |
| 2019/0148800 A1 | 5/2019 | Toth |
| 2019/0237817 A1 | 8/2019 | Hammerschmied |
| 2021/0057708 A1 | 2/2021 | Castillo et al. |
| 2022/0094014 A1* | 3/2022 | Marr ..................... B01D 53/00 |
| 2023/0395947 A1* | 12/2023 | Stojanovski ...... H01M 10/0413 |

* cited by examiner

*Primary Examiner* — James M Erwin
(74) *Attorney, Agent, or Firm* — Quinn IP Law

(57) ABSTRACT

A cell temperature measurement system for a battery module is described. The system may include a cell monitoring unit (CMU) configured to generate temperature measurements for a plurality of battery cells included as part of the battery module according to contactless, optical, or line-of-sight measurements made with one or more sensors associated with a temperature measurement device.

19 Claims, 5 Drawing Sheets

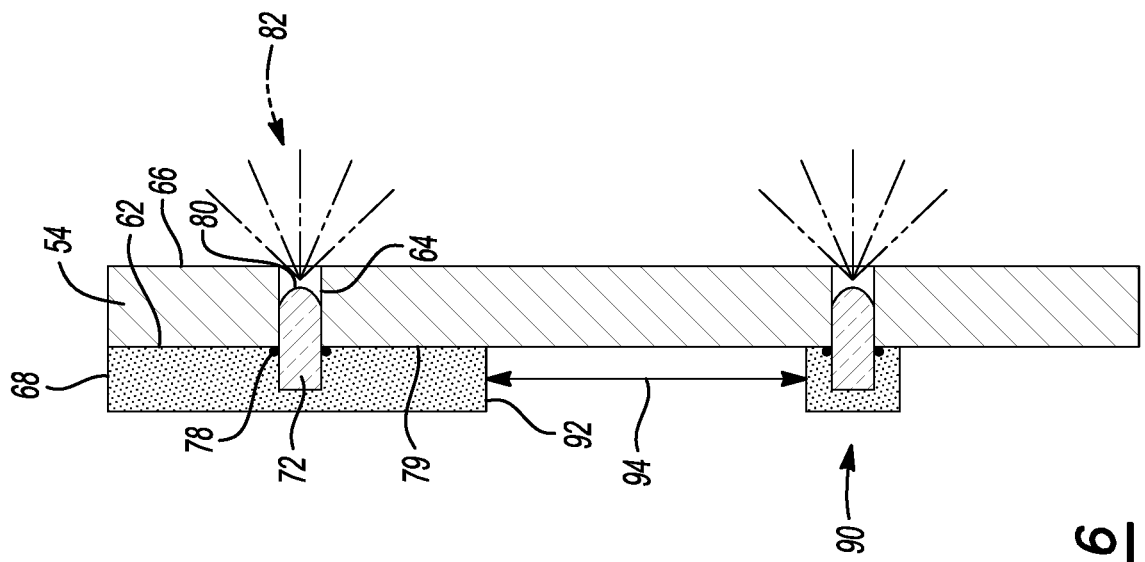
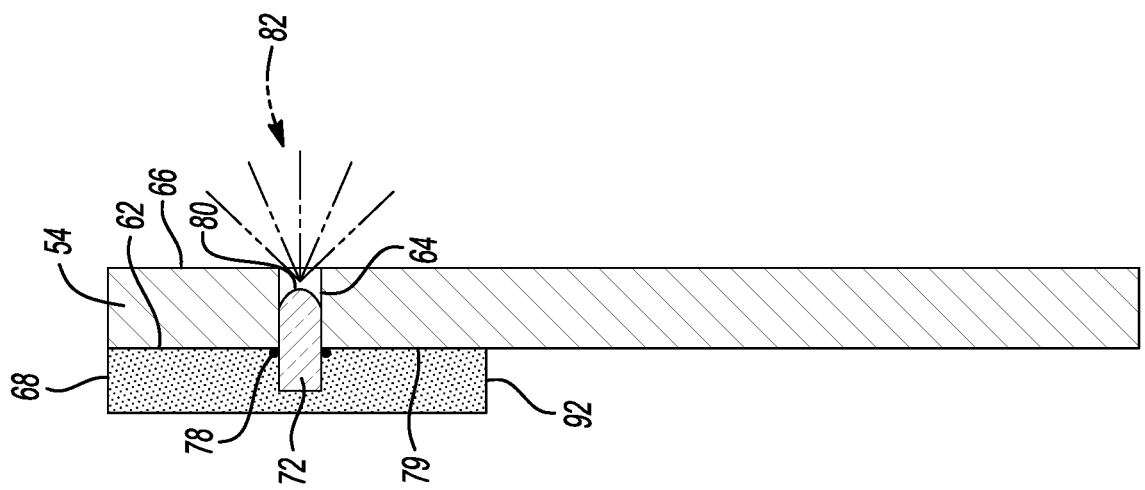

BATTERY CELL GROUP TEMPERATURE MEASUREMENT SYSTEM

INTRODUCTION

The present disclosure relates to battery cell temperature measurement systems, such as but not necessarily limited to a system configured to measure temperature of one or more battery cells according to line-of-sight temperature measurements made with a temperature measuring device.

A battery may be considered as a device that converts chemical energy into electrical energy, such as by means of electrochemical reactions. These electrochemical reactions, particularly in the case of secondary or rechargeable batteries, may be reversible so as to allow the batteries to undergo multiple charging and discharge cycles. Electric vehicles, including hybrid electric vehicles, may be configured to be powered by electric motors or generators that, in turn, may be powered by onboard rechargeable batteries. These types of batteries may include multiple individual electrochemical cells (referred to herein as battery cells) arranged in series and/or parallel and positioned adjacent one another to form battery modules and/or battery packs that, when incorporated in a battery system of an electric vehicle, may be used to provide the vehicle with a combination of high voltage and high capacity. In such high use conditions, it may be beneficial to measure a temperature of the battery cells, e.g., the temperature measurements may be useful to a cooling system typically included within vehicles to transfer heat away from the battery cells.

SUMMARY

One non-limiting aspect of the present disclosure contemplates a cell temperature measurement system, such as but not limited to a system configured to optically measure temperature of one or more battery cells included as part of a battery module. The system may be used within a vehicle to measure temperature of the battery cells according to line-of-sight temperature measurements made with a temperature measuring device. The temperature measuring device may include a plurality of infrared (IR) and/or other optical or non-contacting sensors configured to quickly obtain an accurate measurement of battery temperature, optionally in a manner that minimizes or eliminates contact with battery cells and/or that maximizes an amount of surface area capable of being measured.

Disclosed herein is a battery module for storing and supplying electrical energy. The module may include a plurality of battery cells stacked in side-by-side facing relation with one another with the battery cells each including a battery cell casing with an electrical terminal extending therefrom. The module may further include an electrically insulating module housing with a housing base supporting thereon the battery cells. The module may yet further include an integrated interconnect board (ICB) frame attached to the module housing with the ICB frame including a central cover, endwalls projecting from opposing ends of the central cover, a plurality of electrical busbar connectors attached to an outboard side of the endwalls and electrically connected to the electrical terminals of the battery cells, and a plurality of keyholes extending through one of the endwalls from the outboard side to an inboard side. The module may still yet further include a cell monitoring unit (CMU) attached to the outboard side of the endwall overtop of at least a portion of the keyholes with the CMU including a temperature measuring device configured to optically measure temperature of one or more of the battery cells according to line-of-sight temperature measurements made through the keyholes.

The module may include the temperature measuring device being configured to generate the temperature measurements according to readings taken with a plurality of infrared sensors.

The module may include no more than one of the infrared sensors being through-hole fitted within each of the keyholes.

The module may include the infrared sensors each being configured to make the temperature measurements at least a first surface and a second surface of the battery cells. The first surface may correspond with at least a portion of a cell wingfold included as at least part of each of the electrical terminals. The second surface may correspond with at least an exterior portion of the battery cell casings adjoining a proximal end of the cell wingfolds.

The module may include the infrared sensors projecting beyond a back of the CMU to through-hole fit within a corresponding one of the keyholes, thereby incorporating the infrared sensors with the CMU for subsequent integration with the endwall.

The module may include at least a portion of the keyholes being included with the endwall below the CMU.

The module may include a plurality of fiber optic connectors configured to optically connect the infrared sensors below the CMU to the CMU.

The module may include a plurality of electrical connectors configured to electrically connect the infrared sensors below the CMU to the CMU.

The module may include one or more wireless connectors configured to wirelessly connect the infrared sensors below the CMU to the CMU.

The module may include at least one of the keyholes being included between each of a plurality of thermal barriers disposed between at least a portion of the battery cells, with the thermal barriers being configured to thermally insulate subgroups of the battery cells from each other.

The module may include one or more of the infrared sensors having a seal configured to seal the outboard side of the endwall from the inboard side.

The module may include one or more of the infrared sensors having a gasket configured to seal the outboard side of the endwall from the inboard side.

Disclosed herein is a cell temperature measurement system for a battery module. The system may include a plurality of sensors configured to measure wavelengths according to line-of-sight measurements taken through apertures included in one of a plurality of endwalls with the endwalls projecting from opposing ends of a central cover of an integrated interconnect board (ICB) frame included as part of the battery module. The system may further include a cell monitoring unit (CMU) configured to generate temperature measurements for a plurality of battery cells disposed within the ICB frame based on the wavelengths measured with the sensors.

The system may include the sensors being infrared sensors configured to be through-hole fitted within a corresponding one of the apertures.

The system may include the infrared sensors projecting beyond a back of the CMU to through-hole fit within the corresponding one of the apertures.

The system may include at least a portion of the apertures being included the endwall beyond a footprint of the CMU and one or more connectors configured to connect the infrared sensors include therein to the CMU.

Disclosed herein is a cell temperature measurement system for a battery module of the type having a frame interconnecting a plurality of battery cells configured for storing and supplying electrical energy to a traction motor of a vehicle. The system may include a plurality of sensors configured to facilitate generating contactless temperature readings according to line-of-sight measurements taken for the battery cells through a plurality of apertures included within the frame. The system may include a cell monitoring unit (CMU) configured to generate temperature values according to the measurements taken with the sensors.

The system may include the sensors being infrared sensors configured to project beyond a back of the CMU to be through-hole fitted within a corresponding one of the apertures. The system may include the frame having at least one aperture configured to provide line-of-sight into each of a plurality of battery cell subgroups with the subgroups corresponding within groupings of the battery cells thermally separated from each other with one or more thermal barriers.

The above features and advantages along with other features and advantages of the present teachings are readily apparent from the following detailed description of the modes for carrying out the present teachings when taken in connection with the accompanying drawings. It should be understood that even though the following Figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 5 is an enlarged partial, cross-sectional view taken from the circle 5 of FIG. 4 in accordance with one non-limiting aspect of the present disclosure.

FIG. 6 illustrates an additional sensor being added to the system shown in FIG. 5 in accordance with one non-limiting aspect of the present disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
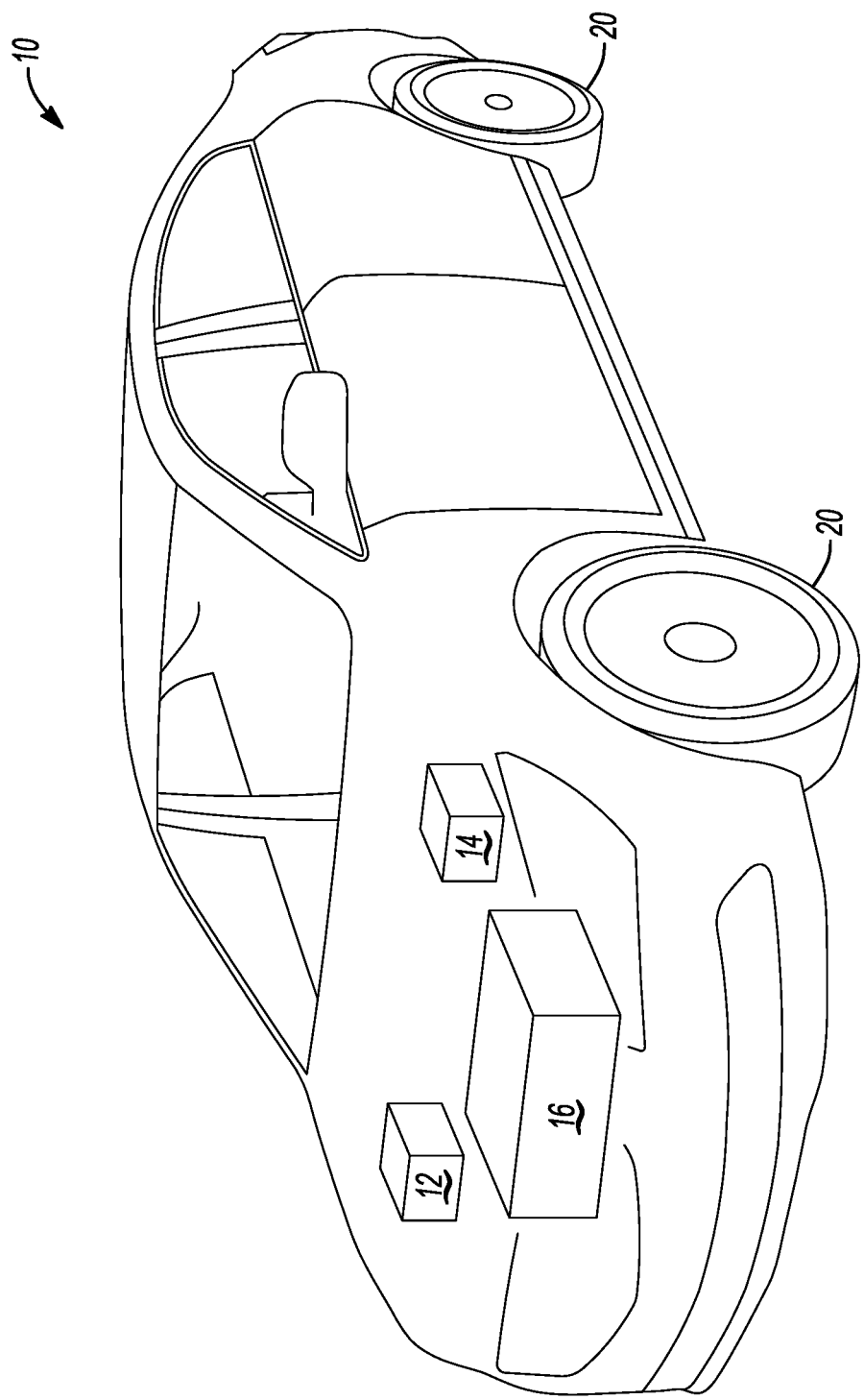
FIG. 1 is a perspective view of a vehicle having a battery module configured with a cell temperature measurement system in accordance with one non-limiting aspect of the present disclosure.

FIG. 1 is a perspective view of a vehicle 10 having a battery module 12 configured with a cell temperature measurement system 14 in accordance with one non-limiting aspect of the present disclosure. The battery module 12 may be included within the vehicle 10 to facilitate supplying electrical energy to or receiving electrical energy from a motor, a generator, or other device in the vehicle, which is referred to for exemplary purposes as being a traction motor 16. The traction motor 16 may be configured to drive one or more of a plurality of wheels 20 according to electrical energy supplied from the battery module 12 and to supply electrical energy to the battery module 12 according to electrically energy generated as a result of regenerative breaking of the wheels. The cell temperature measurement system 14 is predominantly described with respect to facilitating temperature measurements for the battery module 12 when included within the vehicle 10 for non-limiting purposes as the present disclosure fully contemplates its use and application with other types of devices and in other environments, and particularly with respect to measuring temperature of the battery module 12 when the battery module 12 is configured for other purposes besides supplying and receiving electrical energy to and from the traction motor.

Figure 2:
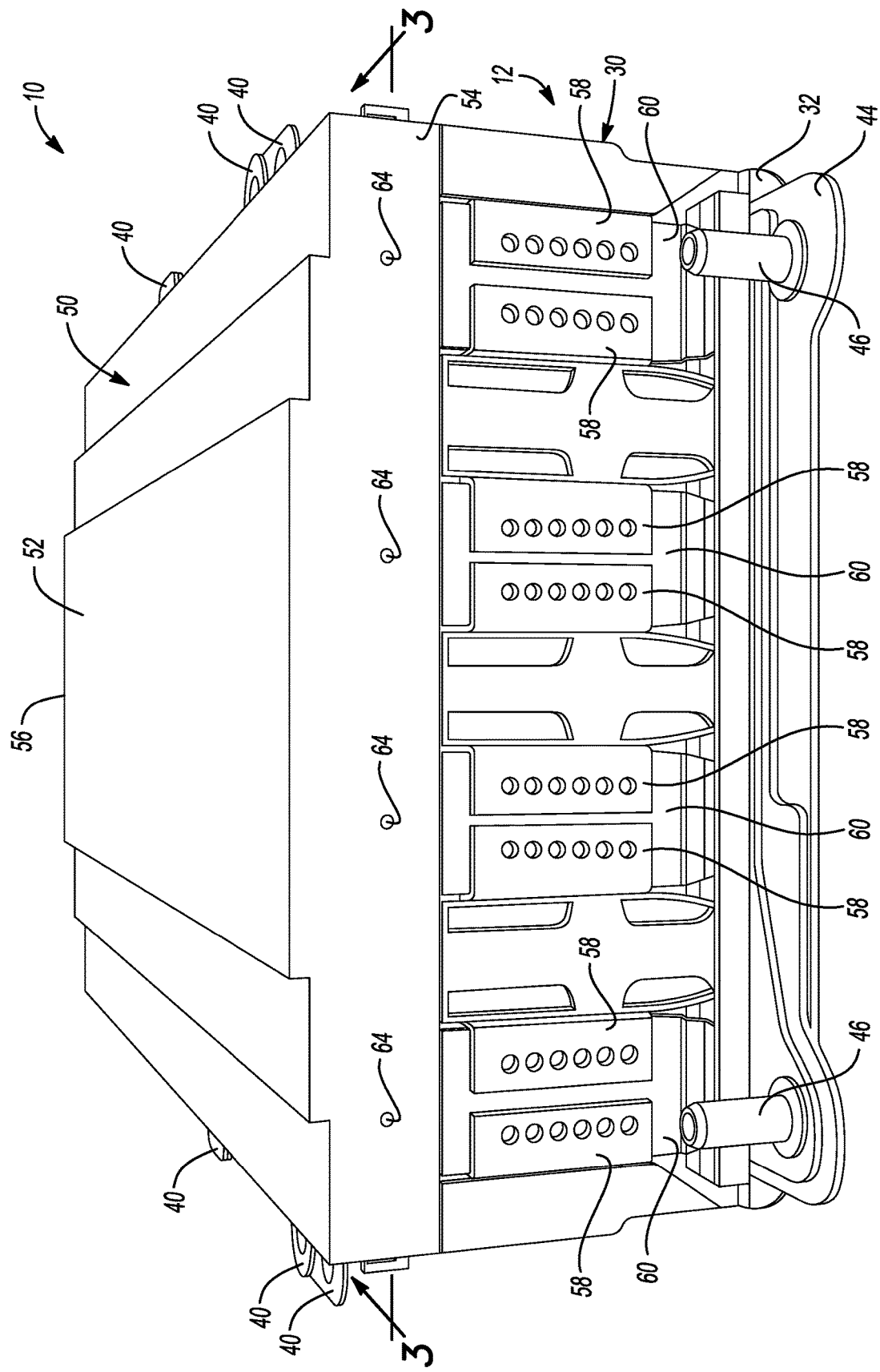
FIG. 2 is a perspective view of the battery module in accordance with one non-limiting aspect of the present disclosure.
Figure 3:
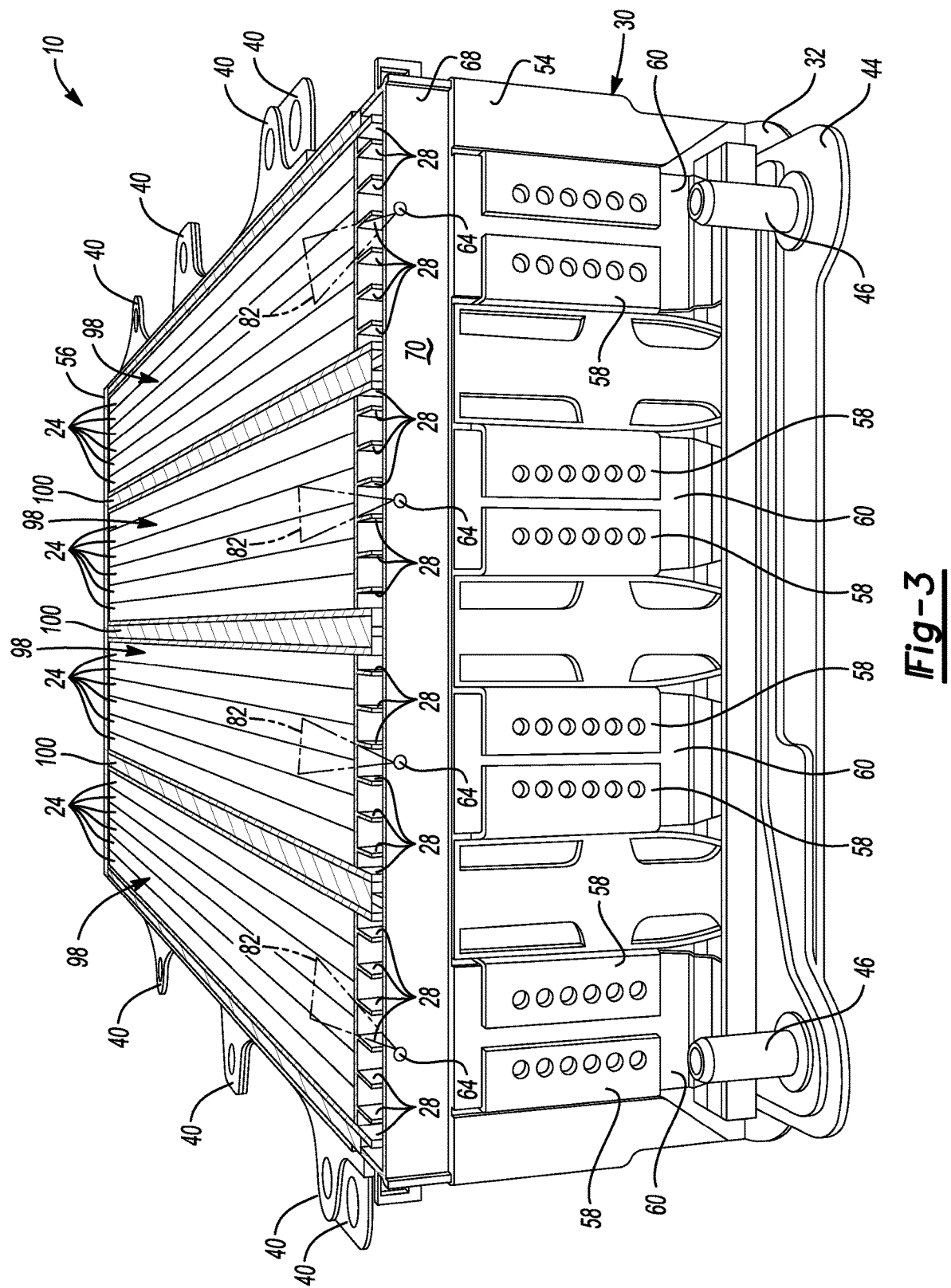
FIG. 3 is a cross-sectional view taken along section line 3-3 in accordance with one non-limiting aspect of the present disclosure.

FIG. 2 is a perspective view of the battery module 12 in accordance with one non-limiting aspect of the present disclosure. FIG. 3 is a cross-sectional view taken along section line 3-3 of FIG. 2. The battery module 12 may include a plurality of electrochemical battery cells 24, such as pouch-type lithium ion (Li-ion) or Li-ion polymer battery cells 24 stacked in side-by-side facing relation with one another and connected in parallel or series for storing and supplying electrical energy, with the vehicle 10 optionally including multiple battery modules 12 of a similar construction. Each battery cell 24 may be constructed with an outer battery casing, which is represented in the drawings by an envelope-like pouch, having an electrical terminal 28 extending therefrom at each end. The casing may be formed of aluminum sheet or foil, or other suitable material, both sides of which may be coated with a polymeric material that insulates the metal from the cell 24 elements and from any adjacent cells 24. While shown as a silicon-based, Li-ion "pouch cell 24" battery, the battery cells 24 may be adapted to other constructions, including cylindrical and prismatic constructions.

The battery module 12 may be configured to store the battery cells 24 inside a protective, electrically insulating battery module housing 30. The battery module housing 30 may be a rigid, multi-part construction assembled from a flanged housing base 32 with a pair of elongated module sidewalls 34, 36 that project generally orthogonally from the base 32. Once properly arranged and mounted, the stacked battery cells 24 may be supported on the housing base 32 and sandwiched between the module sidewalls 34, 36. For ease of manufacture and assembly, the sidewalls 34, 36 may be substantially identical to each other, optionally formed from a rigid plastic material. Mounting brackets 40 may extend transversely from the sidewalls 34, 36 to facilitate mounting within the vehicle 10. A cooling plate 44 may be mounted underneath the stacked battery cells 24 to selectively transfer heat out of the battery module 12. The cooling plate 44 may include one or more coolant channels 46 that pass therethrough a coolant fluid received via coolant ports.

An integrated interconnect board (ICB) frame 50 may be configured to align and electrically interconnect the battery cells 24. The ICB frame 50 may be mounted on top of the battery module 12 housing to provide a protective C-shaped jacket that may be generally defined by a flanged central cover 52 with a pair of flanged endwalls 54, 56 that project generally orthogonally from opposing ends of the central cover 52. The ICB frame 50 may include endwalls 54, 56 segmented into a series of elongated, mutually parallel endwall tabs 58 that may be arranged side-by-side in a vertical column-like fashion. Once the ICB frame 50 may be mounted on the module housing 30, the central cover 52 may be positioned in spaced facing relation to the housing base 32 with the battery cells 24 interposed between the ICB endwalls 54, 56. A plurality of electrical busbar connectors 60 may be attached to an outboard side 62 of the endwalls 54, 56 to electrically connect the electrical terminals 28 of the battery cells 24. A plurality of apertures or keyholes 64 may be included to extend through one of the endwalls 54 from the outboard side 62 to an inboard side 66 for purposes of facilitating the temperature measurement contemplated herein.

A cell monitoring unit (CMU) 68 may be attached to the outboard side 62 of the endwall overtop of at least a portion of the keyholes 64. The CMU 68 may include a temperature measuring device 70 configured to measure temperature of one or more of the battery cells 24 according to line-of-sight temperature measurements made through the keyholes 64. As can be seen in the partial, top view of the cross-sectional shown in FIG. 4, one non-limiting aspect of the present disclosure contemplates the temperature measuring device 70 being configured to generate the temperature measurements according to readings taken with a plurality of infrared sensors or other sensors 72 capable of performing contactless, remote, optical, and/or other line-of-sight temperature measurements. While the present disclosure fully contemplates multiple sensors 72 being included or otherwise through-fitted to the keyholes 64, the system 14 is illustrated with respect to no more than one infrared sensor 72 being disposed within each of the keyholes 64.

The CMU 68 may be comprised of a printed circuit board, a flexible circuit board, and/or other componentry capable of calculating or otherwise determining the temperature or values representing the temperature as a function data collected with the infrared sensors 72. The CMU 68 may optionally include a computer readable storage medium having a plurality of non-transitory instructions stored thereon, which when executed with an associated processor, may be sufficient to facilitate generating the temperature measurements contemplated herein. The illustrated construction and attachment of the CMU 68 to the ICB frame is presented for exemplary and non-limiting purposes as a present disclosure fully contemplates another type of device being similarly configured to execute operations in place thereof, e.g., an electronic control unit (ECU). Such an ECU, for example, may be positioned elsewhere onboard or offboard the vehicle 10, for instance on top of the covering plate or more remotely from the battery module 12 as part of another device outside of the vehicle 10 having capabilities sufficient to wirelessly communicate with the sensors 72. The CMU 68 may optionally be configured to perform other measurements and calculations, such as to facilitate generating and translating senseline voltages into module data, e.g., voltage, current, etc.

Figure 4:
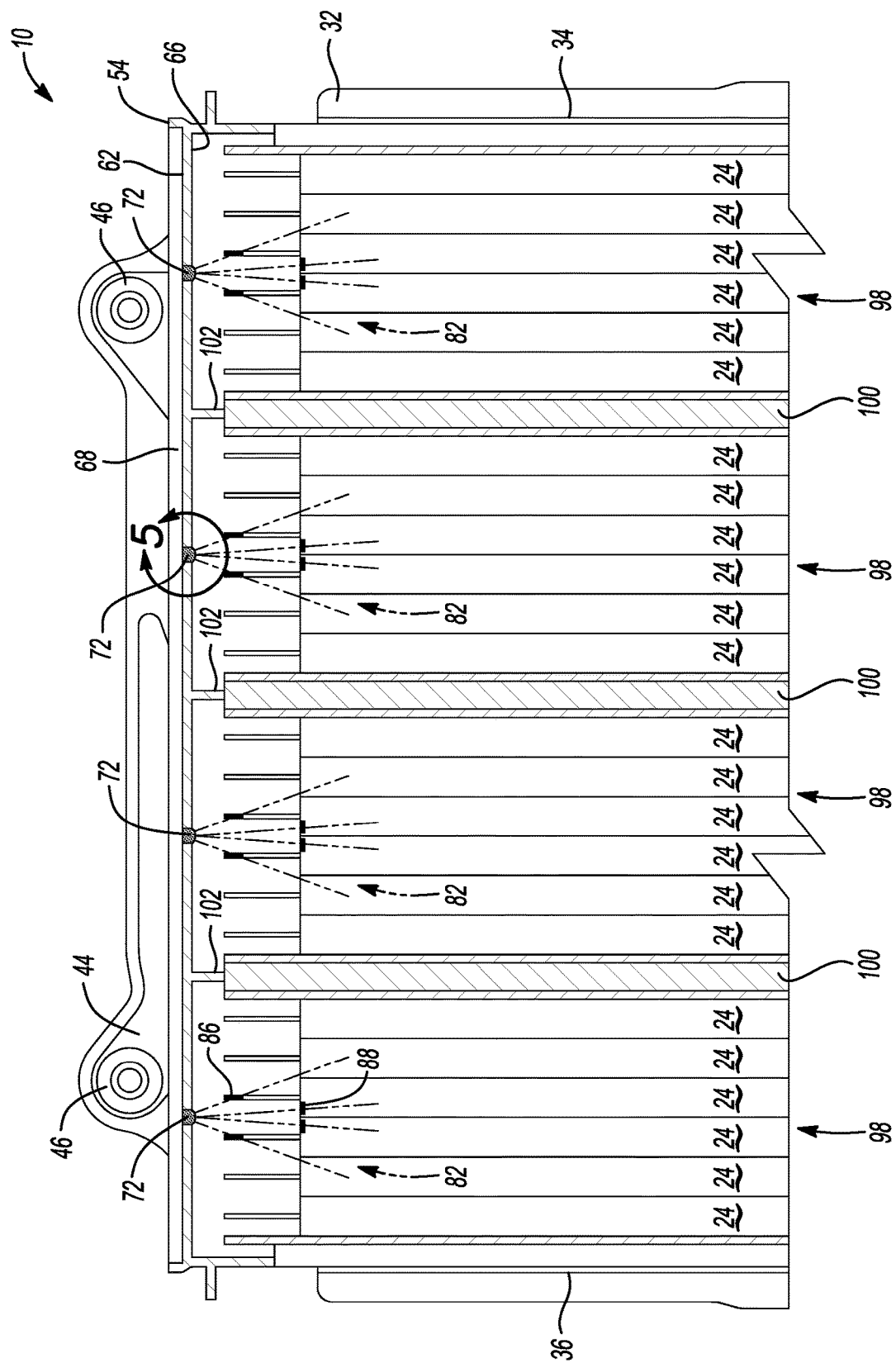
FIG. 4 is a partial, top view of the cross-sectional view shown in FIG. 3 in accordance with one non-limiting aspect of the present disclosure.

FIG. 5 is an enlarged partial, cross-sectional view taken from the circle 5 of FIG. 4 in accordance with one non-limiting aspect of the present disclosure. While omitted from this cross-sectional view for ease of explanation, the system 14 may include additional electronic componentry in addition to the illustrated CMU 68, sensor 72, and gasket 78. The sensor 72 may be configured in the illustrated manner as an encapsulated diode of the type capable of being through-hole or press fitted within the keyhole 64. The sensor 72 may extend from a back 79 of the CMU with a leading end 80 being slightly offset from the inboard side 66 of the ICB frame 50 and sealed thereto with the gasket 78. The gasket 78 is shown to be a pliable material or adhesive centered around the keyhole 64, however, the gasket 78 may be another suitable type of seal or sealant having capabilities to facilitate minimizing or eliminating fluid escaping through the keyhole 64. A viewing angle 82 for the sensor 72 is diagrammatically illustrated with a plurality of field lines, which may define a cone or other field-of-view for the sensor 72. The viewing angle 82 may generally correspond with an area capable of being measured with the sensor 72, i.e., a line-of-sight of the sensor 72.

With reference to FIG. 4, the sensors 72 may be positioned to measure multiple surfaces of multiple battery cells 24, with a few of the surface areas are highlighted for exemplary purposes with darkened shading. One of the measured surfaces may correspond with a first surface 86 generally coinciding with a portion of a cell 24 wingfold included as part of the battery cells 24. Another one of the measured surfaces may correspond with a second surface coinciding with an exterior portion of the battery cell 24 casings adjoining a proximal end of the cell 24 wingfolds. The viewing angle into, the offset depth, the quantity, the positioning, and other variables in the configuration of the sensors 72 may be selected as a matter of design preference depending on the battery surfaces desired for temperature measurement, i.e., the sensor 72 configurations may vary depending on the battery cell 24 surfaces desired to be in line-of-site for measurement. While the present disclosure is predominately described with respect to measuring multiple surfaces, the sensors 72, etc. may be alternatively configured to facilitate pin-point measurements of the type relying upon a smaller viewing angle to focus measurements to a particular portion or single surface of the battery cells 24.

The illustrated capability to use the sensors 72 for purposes of simultaneously read wavelengths or other optical or non-contact related parameters from the battery cells 24 may be beneficial in enabling the CMU 68 to convert that information into temperature measurements without having to physically contact the battery cells 24. The ability to measure the battery temperature without contacting the battery cells 24 directly may be beneficial in maximizing integrity of the system 14, at least in comparison to the use of probes or other contact-reliant measurement tools as such tools may lose or disrupt the required physical contact depending on vibration or other physical demands on the battery module 12. The ability of the sensors 72 to selectively measure temperature over a relatively large surface area, which may optionally include multiple surfaces of the battery cells 24, may also be beneficial in enabling the temperature measurements to be performed across a larger distance of the battery cells 24. This can be helpful in identifying warmer spots or sections of the battery without having to employ multiple senses for each spot.

The contactless sensors 72, particularly in the case of being configured to read infrared or other heat-related signals and/or radiations from the battery cells 24, may be beneficial in eliminating a specific heat of the sensing system 14 influencing the measurements while also enabling detection of cell 24 temperature changes and fluctuations, at least in comparison with the time delay and lag of a probe of other devices that could be used instead to measure temperature through physical contact. During higher heat conditions, for example, it may be beneficial to quickly assess the battery temperature so that a battery control module (BCM) or other device in communication with the CMU 68 can quickly make adjustments to the cool system 14, especially when saving a relatively small amount of time, at least in comparison to probes or other contact based measurements, may be beneficial in thwarting temperature increases during a thermal runaway event. The use of a gasket or other seal 78 may be beneficial in maintaining a seal or other environmental separation between the outboard and inboard sides of the ICB frame 50.

The sensors 72 described above are described as being positioned behind the CMU 68 within essentially an upper third of the ICB endwall 54 for exemplary purposes as the present disclosure fully contemplates a number of arrangements and patterns for positioning the sensors 72 within corresponding keyholes 64. FIG. 6 illustrates an additional sensor 90 being added to the configuration shown in FIG. 5 in accordance with one non-limiting aspect of the present disclosure. The additional sensor 90 may be the located beyond a footprint 92 of the CMU 68 and connected therewith through a connection 94 capable of communicating the sensor 72 readings. The connection 94, for example, may be a shield fiber-optic connection configured to optically connect the additional sensor 72, a wired electrical connection configured to electrically connect the additional sensor 72, and/or RF, optical, or other wireless connection. The additional sensor 90 is also shown for exemplary purposes as being included on the same endwall 54 as the CMU 68 as the present disclosure fully contemplates the additional sensor 90, or more of a number of additional sensors 90, being positioned elsewhere within the battery module 12, such as the opposite endwall 56.

With reference to FIG. 4, the sensors 72 may be configured to facilitate measuring temperature of each one of a plurality of battery cell subgroups 98. The subgroups 98 may correspond with a grouping of the battery cells 24 separated from each other with a thermal barrier 100. A plurality of thermal barriers 100 may be disposed between at least a portion of the battery cells 24 to thermally insulate the battery cells 24 from each other. The thermal barriers 100 may extend vertically from the ICB central cover 52 to the housing base 32, optionally with an inner section 102 connecting to the endwalls 54, 56, to facilitate hermetically sealing the subgroups 98. The sensors 72 are shown to be measuring an upper portion of each subgroup 88 for exemplary purposes as the sensors 72 may be positioned lower and/or multiple sensors 72 may be included to measure other portions of each subgroup 88. The sensors 72 may be configured to provide raw data directly to the CMU 68, e.g., unfiltered measurements of wavelength, etc., and/or the sensors 72 may be configured to process the raw data prior to transmission to the CMU 68, e.g., to add addressing or other identifying information to the data that the CMU 68 can use for identification purposes.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A battery module for storing and supplying electrical energy comprising:
    a plurality of battery cells stacked in side-by-side facing relation with one another, the battery cells each including a battery cell casing with an electrical terminal extending therefrom;
    an electrically insulating module housing with a housing base supporting thereon the battery cells;
    an integrated interconnect board (ICB) frame attached to the module housing, the ICB frame including a central cover, endwalls projecting from opposing ends of the central cover, a plurality of electrical busbar connectors attached to an outboard side of the endwalls and electrically connected to the electrical terminals of the battery cells, and a plurality of keyholes extending through one of the endwalls from the outboard side to an inboard side;
    a cell monitoring unit (CMU) attached to the outboard side of the endwall overtop of at least a portion of the keyholes, the CMU including a temperature measuring device configured to optically measure temperature of one or more of the battery cells according to line-of-sight temperature measurements made through the keyholes;
    a plurality of thermal barriers disposed between at least a portion of the battery cells, wherein at least one of the keyholes is included between each of the plurality of thermal barriers, the thermal barriers being configured to thermally insulate subgroups of the battery cells from each other; and wherein the temperature measuring device includes a plurality of infrared sensors, the temperature measuring device being configured to generate temperature measurements according to readings taken with the plurality of infrared sensors.

2. The module according to claim 1, wherein no more than one of the infrared sensors is through-hole fitted within each of the keyholes.

3. The module according to claim 2, wherein the infrared sensors are each configured to make the temperature measurements on at least a first surface and a second surface of the battery cells.

4. The module according to claim 3, wherein the first surface corresponds with at least a portion of a cell wingfold included as at least part of each of the electrical terminals.

5. The module according to claim 4, wherein the second surface corresponds with at least an exterior portion of the battery cell casings adjoining a proximal end of the cell wingfolds.

6. The module according to claim 1, wherein the infrared sensors project beyond a back of the CMU to through-hole fit within a corresponding one of the keyholes, thereby incorporating the infrared sensors with the CMU for subsequent integration with the endwall.

7. The module according to claim 1, wherein at least a portion of the keyholes are included with the endwall below the CMU.

8. The module according to claim 7, further comprising a plurality of fiber optic connectors configured to optically connect the infrared sensors below the CMU to the CMU.

9. The module according to claim 7, further comprising a plurality of electrical connectors configured to electrically connect the infrared sensors below the CMU to the CMU.

10. The module according to claim 7, further comprising one or more wireless connectors configured to wirelessly connect the infrared sensors below the CMU to the CMU.

11. The module according to claim 1, wherein each of the infrared sensors includes a seal configured to seal the outboard side of the endwall from the inboard side.

12. The module according to claim 1, wherein each of the infrared sensors includes a gasket configured to seal the outboard side of the endwall from the inboard side.

13. A cell temperature measurement system for a battery module, the battery module including a frame interconnecting a plurality of battery cells configured for storing and supplying electrical energy to a traction motor of a vehicle, the system comprising:

a plurality of sensors configured to facilitate generating contactless temperature readings according to line-of-sight measurements taken for the battery cells through a plurality of apertures included within the frame;

a cell monitoring unit (CMU) configured to generate temperature values according to the measurements taken with the sensors;

wherein the sensors are infrared sensors configured to project beyond a back of the CMU to be through-hole fitted within a corresponding one of the apertures; and wherein the frame includes at least one aperture configured to provide line-of-sight into each of a plurality of battery cell subgroups, the subgroups corresponding within groupings of the battery cells thermally separated from each other with one or more thermal barriers.

14. A battery module for storing and supplying electrical energy comprising:

a plurality of battery cells stacked in side-by-side facing relation with one another, the battery cells each including a battery cell casing with an electrical terminal extending therefrom;

an electrically insulating module housing with a housing base supporting thereon the battery cells;

an integrated interconnect board (ICB) frame attached to the module housing, the ICB frame including a central cover, endwalls projecting from opposing ends of the central cover, a plurality of electrical busbar connectors attached to an outboard side of the endwalls and electrically connected to the electrical terminals of the battery cells, and a plurality of keyholes extending through one of the endwalls from the outboard side to an inboard side;

a cell monitoring unit (CMU) attached to the outboard side of the endwall overtop of at least a portion of the keyholes, the CMU including a temperature measuring device configured to optically measure temperature of one or more of the battery cells according to line-of-sight temperature measurements made through the keyholes;

wherein the temperature measuring device includes a plurality of infrared sensors, the temperature measuring device being configured to generate temperature measurements according to readings taken with the plurality of infrared sensors;

one or more wireless connectors configured to wirelessly connect the infrared sensors below the CMU to the CMU; and wherein at least a portion of the keyholes are included with the endwall below the CMU.

15. The module according to claim 14, wherein no more than one of the infrared sensors is through-hole fitted within each of the keyholes.

16. The module according to claim 15, wherein the infrared sensors are each configured to make the temperature measurements on at least a first surface and a second surface of the battery cells.

17. The module according to claim 16, wherein the first surface corresponds with at least a portion of a cell wingfold included as at least part of each of the electrical terminals.

18. The module according to claim 17, wherein the second surface corresponds with at least an exterior portion of the battery cell casings adjoining a proximal end of the cell wingfolds.

19. The module according to claim 14, further comprising:

a plurality of fiber optic connectors configured to optically connect the infrared sensors below the CMU to the CMU.

* * * * *